United States Patent [19]

Smisson

[11] Patent Number: 5,480,559
[45] Date of Patent: Jan. 2, 1996

[54] LIQUID TREATMENT

[75] Inventor: Robert P. M. Smisson, Clevedon, United Kingdom

[73] Assignee: Hydro International PLC, England

[21] Appl. No.: 146,159

[22] PCT Filed: May 18, 1992

[86] PCT No.: PCT/GB92/00894

§ 371 Date: Nov. 15, 1993

§ 102(e) Date: Nov. 15, 1993

[87] PCT Pub. No.: WO92/20627

PCT Pub. Date: Nov. 26, 1992

[30] Foreign Application Priority Data

May 17, 1991 [GB] United Kingdom ............ 9110733
Dec. 19, 1991 [GB] United Kingdom ............ 9126941

[51] Int. Cl.$^6$ ............................................. C02F 1/56
[52] U.S. Cl. ....................... 210/727; 210/738; 210/801; 210/804; 210/199; 210/205
[58] Field of Search ........................ 210/702, 725, 210/727, 734, 738, 801, 804, 806, 199, 202, 205, 207, 787, 788, 512.1, 519, 521

[56] References Cited

U.S. PATENT DOCUMENTS

| 2,425,065 | 8/1947 | Kivari | 210/738 |
|---|---|---|---|
| 3,246,762 | 4/1966 | Sontheimer | 210/195 |
| 3,377,274 | 4/1968 | Burke et al. | 210/727 |
| 3,680,698 | 8/1972 | Liu et al. | 210/714 |
| 4,357,242 | 11/1982 | Chandler | 210/801 |
| 4,451,366 | 5/1984 | Smisson | 210/209 |
| 4,747,962 | 5/1988 | Smisson | 210/788 |
| 5,082,560 | 1/1992 | Eli et al. | 210/738 |
| 5,124,049 | 6/1992 | Maness | 210/738 |

FOREIGN PATENT DOCUMENTS

| 2006512 | 5/1991 | Canada. |
|---|---|---|
| 0380821 | 8/1990 | European Pat. Off.. |
| 2218180 | 11/1972 | Germany. |
| 1019035 | 2/1966 | United Kingdom. |
| 1153032 | 5/1969 | United Kingdom. |
| 2082941 | 3/1982 | United Kingdom. |
| 2158741 | 11/1985 | United Kingdom. |
| 9009222 | 8/1990 | WIPO. |
| WO91/07354 | 5/1991 | WIPO. |
| WO93/08892 | 5/1993 | WIPO. |

*Primary Examiner*—Peter A. Hruskoci
*Attorney, Agent, or Firm*—Larson and Taylor

[57] ABSTRACT

There is disclosed a method of treating liquid carrying suspended solids comprising the following steps: (i) introducing the liquid into a primary treatment vessel (1) and causing agglomeration of solids suspended in the liquid to form flocs which are not settleable to any substantial degree within the time the said liquid is permitted to remain in the primary vessel; (ii) transferring an aqueous component comprising the flocs from the primary treatment vessel (1) to a secondary treatment vessel (5) where a floc of a settleable nature is caused to form; and (iii) permitting said floc to settle under gravity in the secondary vessel (5) and recovering an aqueous component having a substantially reduced concentration of suspended solids relative to the original liquid; wherein the liquid is subjected in the primary vessel to flow patterns, including a low energy circulating flow about a vertical axis of the primary vessel, which provide conditions for the formation of the substantially non-settleable flocs containing suspended solids from the original liquid; and wherein the aqueous component from the primary treatment vessel is subjected in the secondary vessel to flow patterns, including a low energy circulating flow about a vertical axis of the vessel, which provide conditions for rapid formation of flocs and subsequent rapid settlement thereof.

10 Claims, 4 Drawing Sheets

LIQUID TREATMENT

LIQUID TREATMENT

This invention relates to a method of treating a liquid containing suspended matter, for example sewage, and to equipment for use in the treatment of such liquid. More particularly, but not exclusively, the present invention relates to a simple, relatively cheap alternative to the currently available sewage treatment techniques.

Sewage is the general term used to describe domestic and industrial wastewater. Such wastewater generally contains particulate organic and inorganic matter (i.e. suspended solids) and often has a high microbial content. In addition, other components such as phosphates, nitrates as well as various impurities from industrial processes and domestic sources may be present in solution or as colloids (very small unsettleable particles).

The purpose of sewage treatment is to clean wastewater in order to remove undesirable components therefrom such that the resultant effluent may be safely disposed of, for instance to the sea or to a river. In particular, it is important that degradable organic matter in the sewage is removed since such organic matter, if left to decompose aerobically, will drastically reduce the oxygen available to support life in the body of water into which it is discharged. For obvious environmental reasons, the removal of pathogenic microorganisms from the sewage is also highly desirable.

As a result of this concern for the environment, the purity standards required by the relevant authorities for the final effluent resulting from a sewage treatment plant are becoming increasingly stringent. Thus, in Europe, the European Commission has set, or intends to set, high standards for the levels of suspended solids and bacterial (and, in some cases, viral) content in final effluent from sewage treatment works, as well as for the biochemical oxygen demand (BOD) of the resultant effluent. The National Rivers Authority (NRA) in the UK is also setting stringent targets; failure to comply with standards may result in legal action with heavy fines. In the United States, the standards are equally stringent.

In conventional sewage treatment, the incoming sewage is subjected to initial screening and grit separation and is then subjected to a series of stages which result in the cleaned effluent: typically, the stages are as follows:

(i) primary settlement;

(ii) biological treatment;

(iii) secondary settlement;

(iv) tertiary settlement; and/or (v) tertiary treatments.

Typically, primary settlement will remove all gross and a proportion of the fine solids from the sewage, but will not normally reduce the microbial, colloidal or dissolved constituents of the ongoing material. This material is therefore subjected to biological treatments and subsequent secondary settlement steps to remove further settleable solids and oxidisable organic material from the effluent. At this stage, it is common for the effluent to be disposed of and, typically, sewage works effluents have more than $10^6$ coliform organisms/100 ml; however, some existing official requirements necessitate still further tertiary treatment for removal of additional contaminants in the wastewater, such as any ammonia or other forms of nitrogen and phosphates. In order to reduce bacterial content, it is usual to employ disinfectants, such as chlorine, but these have a secondary deleterious effect on the receiving water.

Another disadvantage of current settlement techniques (apart from their inability to reduce substantially the levels of bacteria) is that they are very slow and, as a result, extremely large basins are required in order to handle even modest flows.

Chemical treatment of sewage is well known. In particular, lime is known as a coagulant in sewage stabilisation and in sludge conditioning prior to filtration. The lime may be used with separate addition of other flocculants/coagulants. In addition, metal coagulants, for instance, aluminium and ferric compounds, are widely used in wastewater treatment. In addition, polyelectrolytes (cationic, anionic or nonionic) are often used for improving the quality of finished water for drinking and domestic purposes.

Separators known as "Hydro-Dynamic" separators are low energy devices which operate on the principal of allowing a liquid containing suspended solid material to rotate gently in a cylindrical vessel so that the solid material falls under gravity to the base and there is swept to a central lower outlet by an inward sweeping effect caused by complex flow patterns in the device. It is known that the device is suitable for providing enhanced settlement of solids material from a liquid/solid mixture. Thus, such devices have been used in sewage treatment for separating hard grit from the incoming raw sewage, with the resultant degritted sewage then being passed to a conventional sewage treatment plant. They are also used as "storm water overflows" upstream of conventional sewage treatment works to ensure that gross contamination is separated from liquid waste during storm conditions when the sewage treatment works is unable to cope with the high flow. Such a separator has also been used to assist in the handling of dilute sewage from the town of Gander in Canada to produce an acceptable effluent, with dosing of ferric chloride. "Hydro-Dynamic" separators of this type are described and claimed in, for instance, our British Patent Specifications Nos. 2082941 (corresponding to U.S. Pat. No. 4451366) and 2158741 (corresponding to U.S. Pat. No. 4747962).

The basis of the present invention is the discovery that two separators of the general type described above, operating in tandem, and preferably employing a two stage chemical treatment, may be used to produce a final effluent which is acceptable for immediate disposal. Most surprising is the discovery that the effluent from such an arrangement has a significantly reduced bacterial content; this is most unexpected given the normal persistence of bacterial colonies in effluent from sewage and the complexity of equipment normally required to produce such a quality of effluent using standard techniques.

Thus, in accordance with a first aspect of the present invention, there is provided a method of treating liquid carrying suspended solids comprising the following steps:

(i) introducing the liquid into a primary treatment vessel and causing agglomeration of solids suspended in the liquid to form flocs which are not settleable to any substantial degree within the time the said liquid is permitted to remain in the primary vessel;

(ii) transferring an aqueous component comprising the flocs from the primary treatment vessel to a secondary treatment vessel where a floc of a settleable nature is caused to form; and (iii) permitting said floc to settle under gravity in the secondary vessel and recovering an aqueous component having a substantially reduced concentration of suspended solids relative to the original liquid;

wherein the liquid is subjected in the primary vessel to flow patterns, including a low energy circulating flow about a vertical axis of the primary vessel, which provide conditions for the formation of the substantially non-settleable flocs containing suspended solids from the original liquid;

and wherein the aqueous component from the primary treatment vessel is subjected in the secondary vessel to flow patterns, including a low energy circulating flow about a vertical axis of the vessel, which provide conditions for rapid formation of flocs and subsequent rapid settlement thereof.

In accordance with a second aspect of this invention, there is provided a method of treating a liquid comprising suspended solids comprising the following steps:

(i) introducing the liquid into a cylindrical primary treatment vessel and causing a low energy circulation of the liquid about a central vertical axis of the vessel; stabilising a shear zone in the circulating liquid between an outer, relatively fast circulating, region and an inner, relatively slowly circulating, region: the circulating flow pattern and the stabilised shear zone providing conditions for agglomeration of suspended solids in the vessel to form flocs which are not settleable to any substantial degree within the time the said liquid is permitted to remain in the primary vessel;

(ii) transferring an aqueous component comprising the non-settleable flocs from the primary vessel to a cylindrical secondary vessel and there causing a low energy circulation of the said aqueous component about a central vertical axis of the vessel; stabilising a shear zone in the circulating liquid between an outer, relatively fast circulating, region and an inner, relatively slowly circulating, region; the circulating flow pattern and the stabilised shear zone providing conditions for further agglomeration of the flocs originally formed in the primary vessel to form flocs of a settleable nature; and (iii) permitting said floc to settle under gravity in the secondary vessel and removing an aqueous component having a substantially reduced concentration of suspended solids relative to the original sewage.

In preferred embodiments of this invention, the liquid containing suspended solids is a liquid sewage. The present invention, when used to treat a liquid sewage, has been found to give a final effluent having a substantially reduced bacterial content relative to the original sewage.

The flow patterns which prevail in the primary and secondary vessel may be those which are established in the separating device as initially described in our British Patent No. 2082941 (corresponding to U.S. Pat. No. 4451366) and further described in our European Patent No. 0162650 (corresponding to U.S. Pat. No. 4747962). Those separating devices essentially comprise a vessel having a cylindrical outer wall and a base at one end. (The top of the vessel may be open or closed.) A body is provided within the vessel and defines with the base an annular opening which is spaced from the outer wall; the annular opening should preferably be positioned between about 0.4 and 0.5 times the radius of the vessel from the central vertical axis. The body may be an inverted cone which is aligned with the central axis of the vessel; the cone may be hollow or solid and may be provided with a central opening extending through the cone and aligned with its axis. In addition, there is also provided an annular dip-plate in an upper region of the vessel which is spaced from the outer wall of the vessel and which projects downwardly in the vessel; also in the upper region of the vessel is provided an axially oriented horizontal baffle which obscures direct axial flow of liquid from the vessel to the outlet. With a separating device having these features, when a liquid in the vessel is caused to circulate about the vertical axis of the vessel, a complex flow pattern is established which is fundamental to the efficient separation of solids when the device is in a separating mode but which have also been found now to give enhanced flocculation of non-settleable matter carried in the liquid. The complex flow patterns established can be simplified and expressed as a circulating flow about the central vertical axis of the vessel, the circulating flow being divided between an outer, relatively fast flow and an inner relatively slow flow, the shear zone between these two regions being stabilised by the lower edge of the annular dip-plate and the edge of the said body which defines the mouth of the annular opening. The rate of flow may decrease towards the base of the vessel because of energy losses in the vessel.

The basic principle of the present invention is to flocculate and remove substantially non-settleable matter from a liquid such as sewage in a two-stage treatment. In the first stage, the fine suspended matter in the sewage is caused to agglomerate into so-called "pin-flocs" up to 100 µm in size which are not settleable within the time the liquid is permitted to remain in the primary vessel but which enable the solid matter to be flocculated in a second stage into a dense, settleable form (e.g. flocs of 1 mm or larger in size). The conditions in which the two stages are conducted are therefore critical since it is important (a) that the initial formation and subsequent development of flocs or agglomerates in the vessels occurs relatively quickly (to ensure that the vessels can be relatively compact) and (b) that, once the flocs are formed, they are not destroyed or degraded. These criteria present an apparent dilemma since the conditions necessary to form flocs rapidly (thorough intimate mixing of the sewage) also contribute to the mechanical breakdown of flocs. In particular, it is contrary to established practice that flocs of particulate matter can develop well in a vessel having a circulating flow of liquid coupled with a shear zone which would be expected to degrade flocs rather than promote their formation. It is therefore most surprising that, in accordance with the present invention the non-settleable component of a liquid sewage can be rapidly formed into a settleable floc to leave an acceptable effluent.

Without wishing to be bound by theory, it is currently believed that the shear zone established in the primary and secondary vessels provides an ideal environment for mixing of a suspension of a particulate material whereby the particles in the sewage are gently brought into close proximity with each other thereby enabling the rapid formation of aggregates to occur. Surprisingly, the aggregates, or flocs, are not appreciably degraded and, in the primary vessel, they are maintained in suspension and carried out of the vessel to the secondary vessel and, in the secondary vessel, they settle to the base thereof for subsequent removal.

The term "suspended solids" as used herein is intended to cover colloidal particles as well as other, larger, particles in the liquid.

In each of the primary and second treatment vessels, a process of "agglomeration" occurs in which particles in the liquid sewage (or the effluent from the primary vessel in the case of the liquid in the second vessel) come together to form flocs. In the primary vessel, the agglomeration occurs as a result of "coagulation" which takes place when the DLVO (Derjaguin, Landau, Verivery and Overbeak) energy barrier existing in a stable colloid is effectively eliminated or destabilized. Once this process has taken place there is no barrier to the attractive forces between particles and this leads to the formation of agglomerates of a few colloids at first which quickly bridge together to form microflocs which, in turn (and given time) will gather into visible flocs. This process of floc building may also be termed "flocculation". In the secondary vessel, the non-settleable flocs formed in the primary vessel are flocculated together using a strong flocculant to result in dense settleable flocs.

The flocs formed in the primary vessel are, as has been stated, not settleable to any substantial degree within the time the liquid is permitted to remain in the vessel; typically, this time period will be less than 30 minutes. In passing, it should be noted that the flocs formed in the primary vessel might, if left for several hours under quiescent conditions, be able to settle to form a sludge; such ability to settle should not be construed as meaning that the flocs are settleable to a substantial degree. It should also be noted that the liquid sewage delivered to the primary vessel may include non-colloidal matter which is settleable. This matter will settle in the vessel and be removed at this stage from the sewage.

The flocs formed in the secondary treatment vessel are of a settleable nature; in this context, by "of a settleable nature", we mean that the flocs are capable of settling under gravity relatively rapidly (for example in a period of minutes, for example 30 minutes). It should also be noted that the conditions in the second vessel should be such that the flocs are formed rapidly, for example within 30 minutes.

The final effluent from the secondary treatment vessel should have a substantially reduced concentration of suspended solids. It is to be appreciated that a final effluent may still be acceptable even if it does contain a minor proportion of organic solid matter. In addition, in some circumstances, it may even be desirable to produce a final effluent having a small proportion of organic matter; for example, if the final effluent is to be subjected to a further biological treatment, some organic matter will be required as a feed for the organisms responsible for the biological treatment. As a result, for the purposes of the present invention, it is preferred that the concentration of suspended solids is reduced by at least 60%, and more preferably by at least 90%. It is also preferred that the BOD content of the original sewage is reduced by at least 50%, and more preferably, by at least 80%. In some circumstances, it may be desirable that the final effluent should be substantially free from suspended solids, by which it is meant that the aqueous component is free from any settleable matter and also any residual colloidal (non-settleable) components. It is also preferred that the microbial content of the original sewage is reduced by at least 50% more preferably by at least 2–3 orders of magnitude. (i.e. by 99% or even 99.9%)

The circulating flow which is caused in the primary and secondary vessels should be of a "low energy" nature. In this regard, the energy of rotation should be sufficiently low that any separation of solids occurs under gravitational forces (in a vertical direction) rather than under centrifugal forces (i.e. with a horizontal component). Although low energy in nature, such flows may to the eye appear relatively fast (at the periphery of the vessel, the liquid may have an angular velocity of up to 0.1 m/s; however, such flows are not sufficient to cause any material outward migration of particles. Any outward migration of particles using equipment of the type described in British Patent No. 2082941 will in fact result from torroidal type flows in the vessel (and not the circulating flow).

In a preferred method of the present invention, the aqueous sewage is dosed with a coagulant at the primary treatment vessel, or upstream thereof, and the coagulant-dosed sewage is then subjected to treatment in the primary treatment vessel. The use of a coagulant assists in the initiation/building of a floc.

In addition, it is preferred that the flocculating conditions in the secondary treatment vessel are enhanced by dosing the aqueous component from the primary treatment vessel with a flocculant. This dosing with a flocculant may be carried out at the secondary vessel itself, or at a stage between the primary and secondary vessels, for instance the outlet from the primary vessel. The use of a flocculant enhances formation of dense flocs in the secondary treatment vessel which are of a settleable nature.

The coagulant is added at the primary vessel, or upstream thereof, to cause colloidal-sized particles (or turbidity particles in the 0.1 to 10 μm size range) to come together in small groups, which subsequently form larger aggregates or flocs. It is not necessary, in the primary vessel that settleable flocs should be formed and, therefore, in this vessel, strong flocculants, in amounts effective to cause significant rapid formation of dense settleable flocs, should not be employed.

In the liquid sewage fed to the primary vessel, the colloidal-sized particles are influenced strongly by their electrokinetic charge; each colloidal particle carries a like charge and this causes adjacent particles to repel each other and prevents effective agglomeration and flocculation. As a result, charged colloids tend to remain discrete, dispersed, and in suspension. However, if the charge is significantly reduced (or eliminated), then the particles are free to collide and will gather together first forming small groups and then larger aggregates or flocs. In the present invention, once the particles are gathered together in small (non-settleable) flocs, the suspension is passed to the secondary treatment vessel for further treatment.

In the present invention, it has been found that effective initiation of flocculation in the primary vessel may be produced by the process of charge neutralization in which the charged coagulant is adsorbed on to the surface of the colloidal particles. Such charge neutralization alone will not necessarily produce dense settleable flocs and is therefore particularly suited to the present invention. Some coagulants also assist in flocculation by forming nuclei on which suspended particles may accumulate. Examples of suitable coagulants for use in the first stage of the treatment of the present invention are inorganic coagulants (for instance metal salt such as $Fe^{3+}$ or $Al^{3+}$ salts, e.g. ferric sulphate, ferric chloride, alum, polyaluminium chloride) and low molecular weight (i.e. non-bridging) cationic polymers (e.g. having a molecular weight up to about 200,000). Examples of suitable commercially available cationic coagulants are those marketed by Nalfloc Limited under the names Ultrion 10, Ultrion 8109 W, Ultrion 8105 or Ultrion 20. A mixture of more than one coagulant may be used together with other ingredients, for instance weighting agents which will participate in the formation of aggregates and flocs and provide body and mass to the flocs as well as giving an increased number of nuclei for flocculation. Examples of suitable weighting agents are gypsum and bentonitc clay (which is a colloidal material). Useful results have been obtained using a coagulant comprising a slurry of a ferric salt (e.g. ferric chloride or ferric sulphate), alum (aluminium sulphate) and gypsum (e.g. see British Patent No. 2157278).

By and large, the materials used as coagulants are not strong flocculants and do not, therefore, lead to rapid flocculation of the suspended solids in the sewage. Rather, the coagulant leads to the building of substantial non-settleable flocs containing most of the fine suspended solids in the sewage. The dose rate of the coagulant will vary depending upon the actual chemical used and the quantity of active agent present; it has been found that it may be used in amounts between 50 and 2500 mg/litre to achieve effective results although the precise amount required will need to be determined empirically by the skilled person in the art.

One further factor with the coagulant dosing stage is that the sewage is not overdosed which may result in reversing the charge on the colloid and redispersing it as a colloid of the opposite charge to its original charge; this is of more significance when the coagulant is a very low molecular weight cationic polymer.

Ideally, following treatment of the sewage in the primary vessel, an aqueous component comprising all of the original colloidal matter bound up in small non-settleable flocs (pin flocs or microflocs) is passed to the secondary vessel for further treatment in order to produce a clarified effluent. In the second vessel, strong flocculants are used to flocculate the small microflocs from the primary vessel. Such strong flocculants may be the class of organic polyelectrolytes which are capable of "bridging" between particles in order to bring those particles together in a larger floc. Generally, these polyelectrolytes are of a medium to high molecular weight (i.e. an average greater than 200,000) and they may be non-ionic, anionic or cationic in nature.

Non-ionic polyelectrolytes are polymers with a very low charge density; a typical example is a polyacrylamide and flocculation is achieved through bridging. Anionic polyelectrolytes are negatively charged polymers and are available with a variety of charge densities; those with intermediate charge densities are usually the most useful. Anionic polyelectrolytes are normally used for bridging, to flocculate solids and the acrylamide-based anionics with very high molecular weight (e.g. 10,000,000 or higher) are particularly effective. Cationic polyelectrolytes are positively charged polymers and come in a wide range of families, charge densities and molecular weight; their mode of operation is essentially double acting through both bridging and charge neutralization.

Suitable examples of organic polyelectrolytes for use in the present invention are those marketed by Nalfloc Limited, such as Nalfloc 4762-FC, which is a cationic polyelectrolyte liquid, and Nalfloc 625, which is an anionic polyelectrolyte liquid. Also suitable is the anionic flocculant known as Magnafloc 1011 available as a free flowing granular powder from Allied Colloids Limited and Zetag 92 which is a cationic flocculant again available as a free flowing granular powder from Allied Colloids Limited. The dose rate of the flocculant may be as low as 0.25 ppm up to 5 ppm of the active agent.

The actual choice and quantity of flocculant will depend upon the extent to which the charge on the original colloidal particles has been altered as well a on the particular sewage being treated.

The precise chemical treatment to be used in the method of the present invention depends upon the sewage being treated. It is therefore necessary for the precise chemical treatment to be determined empirically for each particular site. This is because characteristics of the sewage, such as the type and quantity of suspended solids, the acidity or alkalinity, the level of bacterial contamination, etc. will all affect the choice of chemicals. Accordingly in the method of the present invention, it is necessary initially to determine the most suitable combination of chemicals for the treatment of particular sewage and intermittently check that the conditions have not changed requiring alteration of the chemical dosing regimen. These tests may be simple "Jar" tests (coagulation mixing tests) in which a series of samples of sewage are treated with a range of chemicals, in different doses. The samples are stirred and then allowed to stand and, after a set time, the supernatant is examined for color and turbidity. The principle of "jar" testing is well known to the man skilled in the art.

The mechanism by which the present invention works is not presently fully understood. It is theorized, however, that the flocs formed in the primary settlement vessel act as supports which adsorb bacteria and other dissolved contaminants from the aqueous phase. These flocs are then flocculated rapidly in the secondary settlement vessel where they settle to the base of the vessel and are removed before the bacteria have an opportunity To return to the aqueous phase. It is presently thought that the rapid settlement of the flocs in the secondary settlement vessel using a separator operating on the principles first described in our British Patent Specification No. 2082941 is of particular importance. For this reason, it is believed that the secondary treatment vessel employed in the method in accordance with the first aspect of the present invention may be replaced by an alternative device which is capable of rapidly removing settleable solids material from the aqueous phase of a liquid suspension.

The rate of flow of sewage into each device and the volume of each vessel should be chosen such that the average residence time of liquid in each vessel is of the order of minutes, rather than hours. Presently preferred is that the residence time in the first vessel should be up to 10 minutes, preferably 3 to 4 minutes and, for the second vessel, up to 30 minutes.

In accordance with another aspect of this invention, there is provided sewage treatment equipment comprising two interconnected low energy separators each being of the type comprising:

(a) a vessel having a cylindrical outer wall and a base at one end;

(b) a body which is provided within the vessel and which defines with the base an annular opening spaced from the outer wall;

(c) an inlet for introducing a liquid containing suspended solids into the vessel;

(d) an outlet in an upper region of the vessel for removing an aqueous phase from the vessel;

(e) an annular dip-plate in an upper region of the vessel and spaced from the outer wall of the vessel for stabilising flow patterns in the vessel; and (f) means for promoting a circulating flow of liquid and suspended solids within the vessel, such rotational movement being of sufficiently low energy that any separation of the solids components of the liquid in the vessel is brought about primarily by gravity;

the arrangement of the components of the vessel being such that, in use, there is created a stabilized shear zone in the circulating liquid between an outer, relatively fast circulating region and an inner, relatively slowly circulating region and there is caused an inward sweeping effect of any solids accumulated at the base of the vessel towards the said annular opening;

wherein one of the vessels constitutes a primary treatment vessel and the other constitutes a secondary treatment vessel, the outlet of the primary treatment, vessel communicating with the inlet of the secondary treatment vessel.

The equipment may further comprise a coagulant doesn't device located upstream of the first separator and a flocculant dosing device located between the two separators.

Additionally, each separator may include in its upper region a horizontal baffle plate symmetrically aligned about the axis of the vessel and which obscures direct axial flow of liquid from the vessel to the outlet.

Such low energy separators are described in our British Patent Specification No. 2082941.

The low energy separator employed may include provision for introducing an energising fluid into the vessel in a manner to create or enhance rotational movement of liquid within the vessel. This is particularly suitable for the secondary treatment vessel. The principle is described in our British Patent Specification No. 2158741.

The dosing of the sewage with a coagulant is enhanced if a thorough mixing stage is included. In a preferred embodiment of the present invention, the coagulant is dosed to the sewage by way of a device known as a vortex valve. A vortex valve is a device for regulating the flow of a liquid without moving parts. It has been found that vortex valves are particular useful for mixing a chemical into sewage if the rear axial wall of the vortex valve is provided with an opening so that the chemical may be applied directly to the vortex on the axis of the valve. This ensures sufficient mixing, but avoids any over-mixing.

The flocculant may be dosed to the effluent from the primary separator by means of a flocculant dosing device. In order to ensure satisfactory monitoring of the chemical dosing, a meter, or other measurement device, may be provided immediately downstream of the coagulant dosing point and/or the flocculant dosing point and a feedback or feed forward mechanism may be employed to adjust the concentration of chemical being introduced.

Further advantages may be achieved by recycling some of the solids removed from the liquid which has been treated in the secondary treatment vessel (and which will contain active coagulant) to provide nuclei for initiation of flocculation. In some circumstances, it may be possible to recycle all of the sludge recovered after treatment in the secondary treatment vessel; since the solids in such sludge has already been flocculated, it can be allowed to settle in the primary treatment vessel from where it can be removed for disposal. This would enable a sludge well downstream of the secondary treatment vessel to be dispensed with.

Reference is hereby drawn to our British Patent Specification No. 2210995 which relates to a vortex valve having an emergency by-pass feature and to U.S. Pat. No. 4206783. These documents, whilst not relating specifically to the type of vortex valve used in the present invention, do illustrate the general characteristics of vortex valves and the principles upon which they operate.

BRIEF DESCRIPTION OF THE DRAWINGS

For a better understanding of the present invention, and to show how the same may be carried into effect, reference will now be made, by way of example only, to the accompanying drawings in which.

Figure 1:
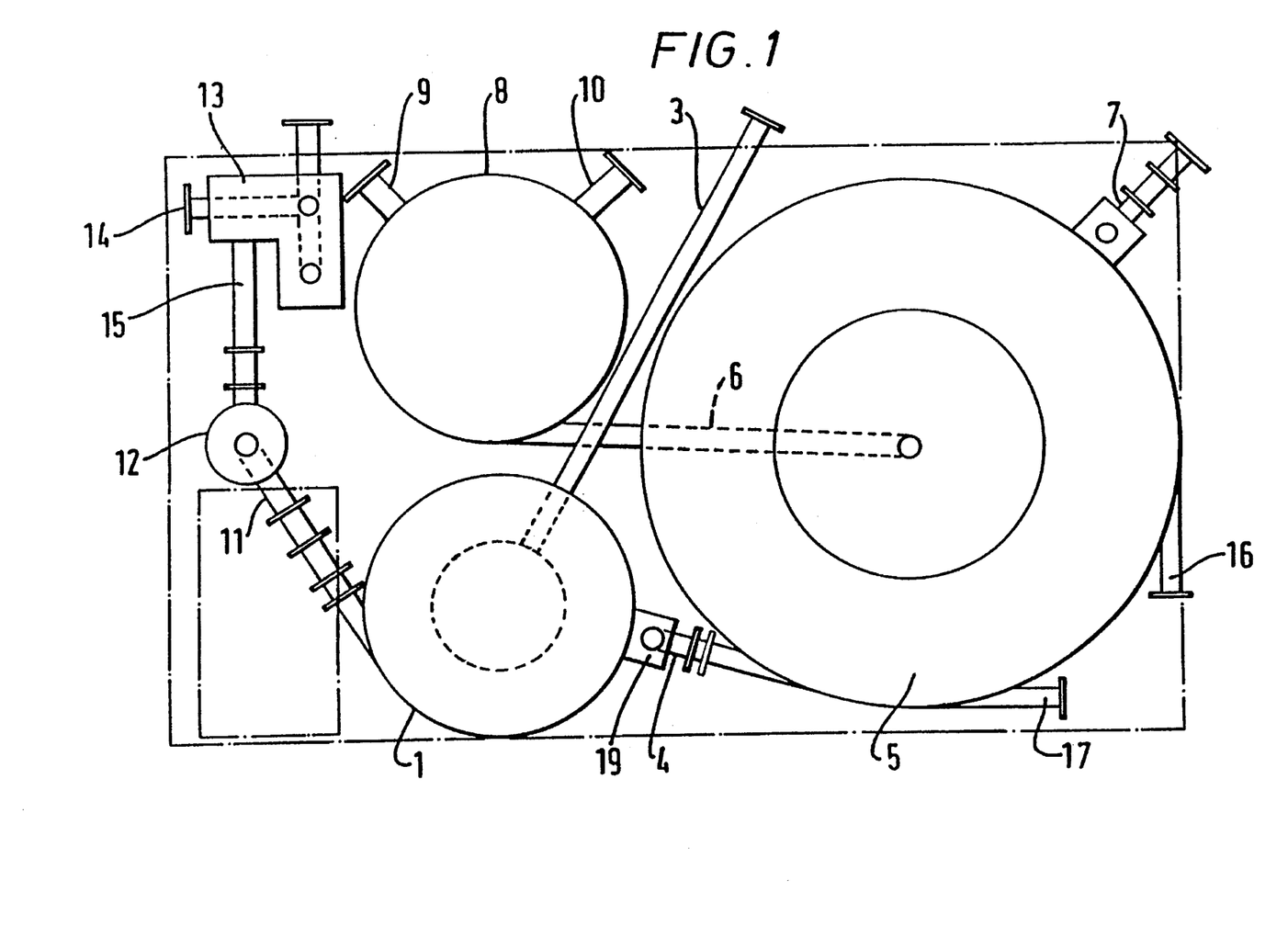
FIGS. 1 and 2 are schematic plan and elevation representations respectively of a sewage treatment equipment in accordance with the present invention.
Figure 2:
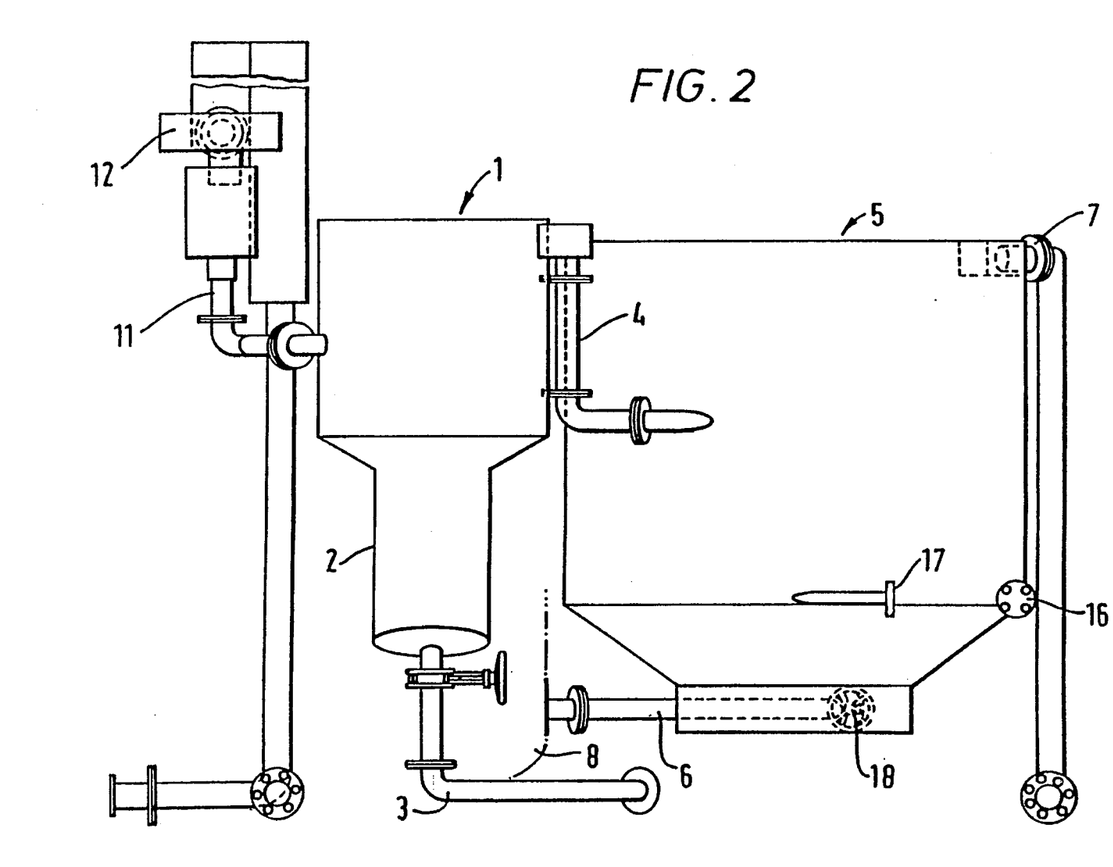
Figure 3:
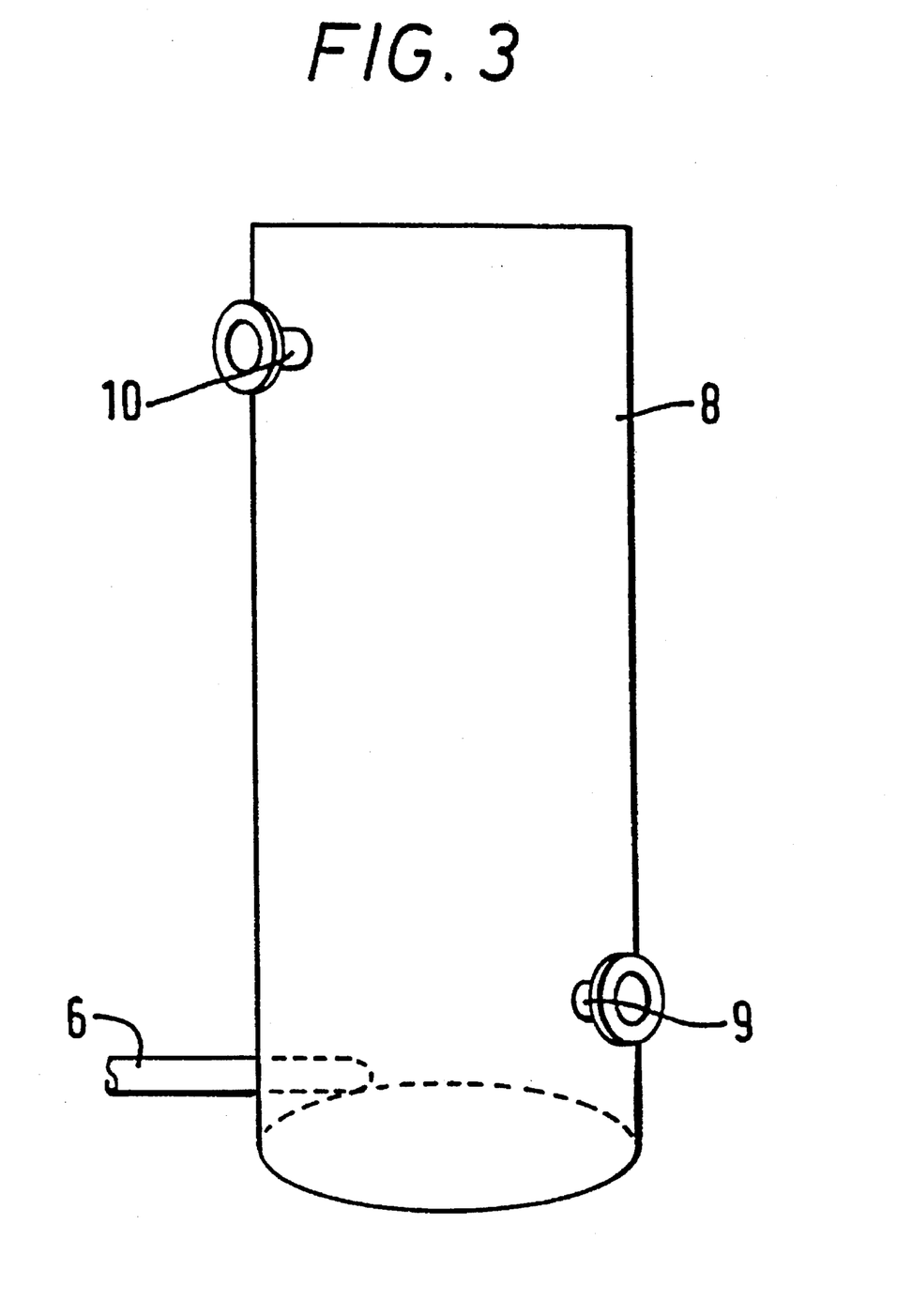
FIG. 3 is an elevation view of the sludge well (which is omitted from FIG. 1 for clarity)

With reference first to FIGS. 1 to 3, the sewage treatment equipment can be seen to comprise a cylindrical primary settlement vessel 1 having an elongate sump 2, a lower outlet pipe 3 and an upper outlet pipe 4 which communicates directly with a cylindrical secondary settlement vessel 5. The secondary vessel 5 has a lower outlet pipe 6 and an upper overflow 7 for removal of cleaned effluent. The lower outlet pipe 6 of secondary vessel 5 communicates with a sludge well 8 (not fully shown in FIG. 2 but shown separately in FIG. 3) which has sludge outlet 9 and supernatant outlet 10. The primary vessel 1 is fed with sewage for treatment via conduit 11. The sewage is dosed with a coagulant at coagulant dosing device 12. Upstream of coagulant dosing device 12 is a header tank 13 which is fed by a pump (not shown) via inlet 14; header tank 13 communicates with the coagulant dosing device 12 via conduit 15.

Figure 5:
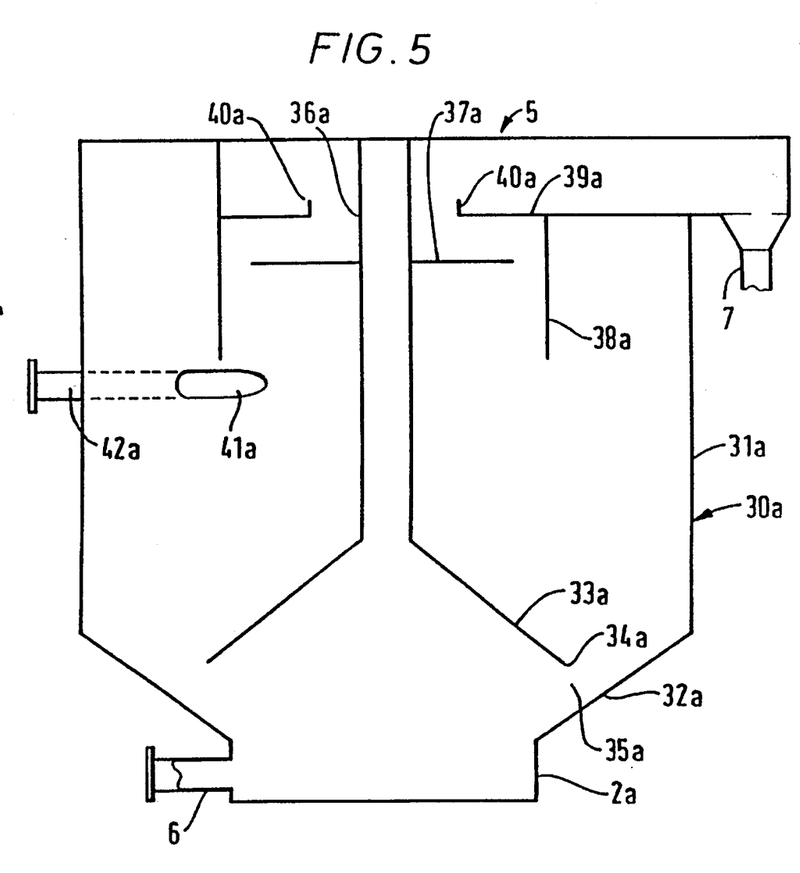

Primary settlement vessel 1 as shown is a low energy separator of the type described and illustrated in our British Patent No. 2082941; the secondary settlement vessel 5 as shown is a low energy separator, having provision for introduction of an energising fluid, as described and illustrated in our British Patent No. 2158741 (although it should be noted that the added energy ports are not in use in the apparatus shown).

Solids accumulated at the base of separator 5 are periodically drawn off into sludge well 8, for instance by opening a valve controlled by handle 18.

In use, sewage for treatment is pumped to the header tank 13 via inlet 14. From header tank 13, the sewage is fed via conduit 15 to dosing device 12 where the sewage is dosed with coagulant. From there, the coagulant-dosed sewage is fed via conduit 11 to primary settlement vessel 1 where it is caused to flow in a rotational or circulating fashion. In this vessel 1, flocculation of fine solids suspended in the sewage is initiated. Some solids material, such as grit and large lumps of organic matter, may settle under gravity into the elongate sump 2 at the base of the vessel 1 and this is removed by outlet pipe 3. The aqueous suspension of organic matter and substantially nonsetteable flocs is passed via outlet pipe 4 to the secondary treatment vessel 5. At the exit from the primary vessel 1, the suspension is given a second chemical dose, this time with a flocculant, via a flocculant dosing device 19. The flocculant-dosed suspension is caused to circulate in vessel 4 and solids material settles under gravity under the flow patterns which prevail and which are described in our British Patent Specification No. 2082941, and is removed via outlet pipe 6 to sludge well 7. Clarified effluent is removed from an upper region of secondary vessel 5 via upper overflow 7.

Sludge may be discharged from sludge well 8 via sludge outlet 9, whilst any supernatant may be removed via supernatant outlet 10.

Figure 4:
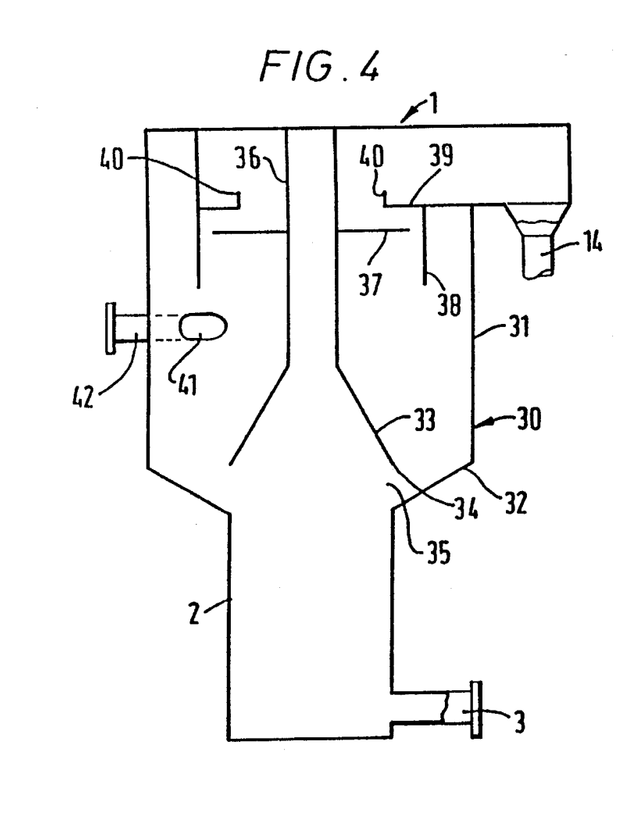
FIGS. 4 and 5 show the internal configuration of the primary and secondary treatment vessels of the equipment shown in FIGS. 1 and 2.

The internal structure of the primary separator 1 is shown in FIG. 4. The separator comprises a cylindrical chamber 30 having an outer wall 31 and a base 32. A sump 2 is situated at the bottom of the vessel 1 to collect solid material separated out of the liquid mixture entering the vessel 1. Supported inside the chamber 30 is an inverted cone 33 which has a peripheral edge region 34 which, with the base 32, defines an annular gap 35. The cone 33 is supported by a column 36 which also supports a horizontal baffle plate 37. Projecting downwardly into the vessel is an annular dip plate 38. The top of the vessel is partially enclosed by a lid 39 having a central opening, the edge at the lid's inner periphery being upturned. Liquid is introduced into the vessel 1 via a tangential inlet 41 which is fed by pipe-line 42. Solids material may be removed from the sump via outlet 3 and the aqueous phase may be removed via outlet 14.

The secondary treatment vessel 5 is structurally similar to the primary treatment vessel 1 and therefore like parts have been numbered with like reference numerals (but with the designation "a") except for the lower outlet 6 which is for discharging solid material accumulated at the base and the upper outlet 7 which is for discharging a classified aqueous phase.

Secondary settlement vessel 5 includes an inlet 16 for introduction of an energising liquid to enhance rotational movement of liquid in the vessel 5 and ensure that solid matter does not accumulate at the base, but is swept inwards to the entrance to the outlet pipe 6 and thence to sludge well 8. Secondary vessel 5 also includes an outlet 17 for removal of liquid from the vessel, which removed liquid may then be energised by a pump (not shown) and returned to the vessel 4 as the energising liquid via inlet 16. This apparatus may also be operated without taking advantage of the possibility of introducing an energising liquid via inlet 16. Even if the added energy feature is employed, it should be noted that the operation of the device is still low energy in the sense that separation still occurs primarily under the influence of gravity.

In use of both the primary and secondary treatment vessels, a liquid phase is introduced into the vessel via the tangential inlet 41 (41a) so as to create a low energy circulating flow of liquid in the vessel 1 (5). The internal arrangement of the components of the separator assists in establishing complex flow patterns in the vessel; a shear zone is stabilised between the lower peripheral edge of the cone 34 (34a) and the bottom edge of the dip plate 38 (38a). The complex flow patterns permit solid matter in the vessel to settle under gravity and cause this matter to be swept through the annular opening 35 (35a) to the sump 2 from whence it may be discharged via the lower outlet 3 (6). An aqueous phase passes between the gap between the horizontal baffle 37 (37a) and the dip plate 38 (38a) and from there into an upper region of the vessel 1 and out of the vessel via outlet 14 (7).

The aqueous phase entering the primary treatment vessel is a raw sewage (from which grit and other gross solids may have been screened) which has been dosed with a coagulant. This dosing causes initiation of flocculation in the primary treatment vessel although in this vessel it is not intended that solids should settle and be collected. Any solids which do settle are those having a relatively high settling velocity and which sink immediately to the base and are swept to the sump 2. The majority of the solid material (for instance the colloidal material) in the aqueous sewage is carried out of the vessel via outlet 14 (7) and, from there, via inlet 41 (41a) into the secondary treatment vessel. Between the primary and secondary treatment vessels the partially treated sewage from the primary vessel is dosed with a flocculant which causes rapid building of large flocs in the primary treatment vessel; these large flocs settle under gravity to the base 32a from where the are swept to the sump 2a for discharge. An aqueous phase passes out of the upper region of the vessel 5 via outlet 7. This aqueous phase is substantially free from any suspended solids and moreover has a very low bacterial level.

The sewage treatment equipment illustrated in FIGS. 1 and 2 was used in tests to treat a sewage and evaluate its performance. The coagulant used was a ferric/alum/gypsum mix such as that commonly used in water treatment. This chemical was introduced into the sewage flow at the coagulant dosing device 12. The flocculant used was Zetag 92 made by Allied Colloids Limited. A dissolver was used to produce a solution of low viscosity and a concentration of 2500 mg/l was selected. Volumetric dosing rates in the range of 100 to 200 ml/minute were used into flocculant dosing device 15.

The test was also run using alum containing 8% $Al_2O_3$.

The plant was filled with sewage and a flow rate set. During the first hour of operation, dosing was initiated and after 1½ to 2 hours a clarified effluent was taken from outlet 6 and analyzed for chemical and microbial content. The tests obtained are shown in the Table 1. It will be noted that the percentage removal of suspended solids and BOD is high whilst the removal of microbial content (total Cell, E.Coli and F. Streptomyces) is extremely high and this is evidence that the sewage treatment equipment in accordance with the present invention is capable of producing extremely clean effluent is suitable for discharge without further treatment for removal of solids and bacteria content.

TABLE 1

| TEST NO. | FLOW TREATED l/s | COAGULANT ppm of stock solution | | FLOCCULANT mg/l active chemical | BOD removal % | SS removal % | TOTAL COLI removal % | E. COLI removal % | F. STREP removal % |
|---|---|---|---|---|---|---|---|---|---|
| 1 | 2.47 | Alum | 337 | Zetag 92 3.6 | 73 | 89 | 99.3 | 97.9 | 99.0 |
| 2 | 2.16 | FAG | 748 | Zetag 92 0.4 | 69 | 81 | 92.8 | 84.6 | 83.3 |
| 3 | 2.16 | FAG | 748 | Zetag 92 0.4 | 70 | 90 | 99.94 | 99.98 | 99.5 |
| 4 | 1.61 | FAG | 1107 | Zetag 92 0.6 | 68 | 90 | 93.3 | 90.4 | 97.7 |
| 5 | 1.83 | FAG | 1238 | Zetag 92 2.9 | 53 | 80 | 93.3 | 88.5 | 93.5 |
| 6 | 1.83 | FAG | 1238 | Zetag 92 2.9 | 78 | 99 | 99.3 | 98.3 | 98.9 |
| 7 | 2.73 | FAG | 1037 | Zetag 92 2.4 | 71 | 97 | 98.7 | 98.7 | 99.0 |

Note:
FAG = Ferric (ferric sulphate)/Alum (hydrated aluminium sulphate)/gypsum coagulant blend

I claim:

1. A method of treating sewage carrying suspended solids and bacteria comprising the following steps:

(i) introducing said sewage into a primary treatment vessel and causing agglomeration of solids suspended in the liquid to form flocs including said bacteria which are not settleable to any substantial degree while said sewage is permitted to remain in the primary vessel;

(ii) transferring an aqueous component comprising the flocs from the primary treatment vessel to a hydro-dynamic separating device where a floc including said bacteria of a settleable nature is caused to form; and (iii) permitting said floc to settle under gravity in said hydro-dynamic separating device and recovering an aqueous component having a substantially reduced concentration of suspended solids relative to the sewage introduced into the primary treatment vessel in step (i);

wherein the sewage is subjected in the primary vessel to flow patterns, including a circulating flow about a vertical axis of the primary vessel sufficient to provide conditions suitable for the formation of the substantially non-settleable flocs containing suspended solids and bacteria from the sewage introduced into the primary treatment vessel in step (i);

and wherein the aqueous component from the primary treatment vessel is subjected in the hydro-dynamic separating device to flow patterns, including a circulating flow about a vertical axis of said hydro-dynamic separating device sufficient to provide conditions suitable for rapid formation of flocs and subsequent rapid settlement thereof, the sewage is dosed with coagulant at the primary treatment vessel or upstream thereof and the aqueous component from the primary treatment vessel is dosed with a flocculent to enhance the flocculating conditions in the secondary treatment vessel.

2. A method according to claim 1, wherein the coagulant used in the primary treatment vessel is selected from the group consisting of inorganic coagulant and cationic polymers having molecular weights up to about 200,000.

3. A method according to claim 2, wherein the inorganic coagulant is a metal salt.

4. A method according to claim 3, wherein the metal salt is an $Fe^{3+}$ or $Al^{3+}$ salt.

5. A method according to claim 4, wherein the metal salt is selected from ferric chloride, alum and polyaluminum chloride.

6. A method according to claim 2, wherein the cationic polymer has a molecular weight up to about 200,000.

7. A method according to claim 1, wherein the flocculent is selected from the class of organic polyelectrolytes which are capable of bridging between particles in order to bring those particles together in a larger floc.

8. A method according to claim 7, wherein the flocculent is an organic polyelectrolyte having an average molecular weight greater than 200,000.

9. A method according to claim 1, wherein, in step (i), the primary treatment vessel is a vessel of a hydrodynamic separating device.

10. A method of treating sewage comprising suspended solids and bacteria comprising the following steps:

(i) introducing the sewage into a cylindrical primary treatment vessel and causing a circulation of the sewage about a central vertical axis of the vessel; stabilising a shear zone in the circulating sewage between an outer, relatively fast circulating region and an inner, relatively slowly circulating region; the circulating flow pattern and the stabilised shear zone providing conditions for agglomeration of suspended solids in the vessel to form flocs including said bacteria which are not settleable to any substantial degree while said sewage is permitted to remain in the primary vessel;

(ii) transferring an aqueous component comprising the non-settleable flocs from the primary vessel to a cylindrical secondary vessel and there causing a circulation of the said aqueous component about a central vertical axis of the vessel; stabilising a shear zone in the circulating sewage between an outer, relatively fast circulating region and an inner, relatively slowly circulating region; the circulating flow pattern and the stabilised shear zone providing conditions for further agglomeration of the flocs originally formed in the primary vessel to form flocs including said bacteria of a settleable nature; and (iii) permitting said flocs to settle under gravity in the secondary vessel and removing an aqueous component having a substantially reduced concentration of suspended solids relative to the sewage introduced into the primary treatment vessel in step (i), the sewage is dosed with coagulant at the primary treatment vessel or upstream thereof and the aqueous component from the primary treatment vessel is dosed with a flocculent to enhance the flocculating conditions in the secondary treatment vessel.

* * * * *